United States Patent [19]

Strassburg

[11] 4,380,876
[45] Apr. 26, 1983

[54] RETICLE AND METHOD OF MAKING THE SAME

[75] Inventor: Ronald A. Strassburg, Ruidoso, N. Mex.

[73] Assignee: W. R. Weaver Co., El Paso, Tex.

[21] Appl. No.: 205,028

[22] Filed: Nov. 7, 1980

[51] Int. Cl.³ .......................... F41G 1/38; G02B 27/32
[52] U.S. Cl. ........................................ 33/297; 156/629; 156/644; 33/246; 356/247
[58] Field of Search ....................... 33/297, 298, 246; 156/629, 634, 644, 664; 356/247

[56] References Cited

U.S. PATENT DOCUMENTS

| | | | |
|---|---|---|---|
| 2,275,631 | 3/1942 | Johnson | 33/298 |
| 2,437,228 | 3/1948 | Mears et al. | 33/297 |
| 3,813,310 | 5/1974 | Droege et al. | 156/644 |
| 3,826,012 | 7/1974 | Pachmeyr | 33/246 |
| 4,033,046 | 7/1977 | Burris | 33/297 |

FOREIGN PATENT DOCUMENTS 126323  5/1919  United Kingdom .................. 33/297

*Primary Examiner*—Steven L. Stephan
*Attorney, Agent, or Firm*—Ralph D'Alessandro; Donald F. Clements; Thomas P. O'Day

[57] ABSTRACT

The reticle is composed of two adjacent parts, each of which comprises a circular periphery with one cross hair extending across the circular periphery. The cross hair on one part is disposed at a 90° angle with respect to the cross hair on the other part to form the reticle aiming point. Each part is made by a chemical machining method.

4 Claims, 3 Drawing Figures

RETICLE AND METHOD OF MAKING THE SAME

This invention relates to a reticle for use in an optical gunsight, and more particularly to a compound cross hair reticle formed from two adjacent parts. The parts from which the reticle of this invention is formed are produced by chemical machining.

Chemical machining is a known technique for producing intricate or delicate metal parts from drawings or photographs. This technique can be used to make parts from almost any metal which is in sheet or strip form. The chemical machining process consists of transferring an image of the part photographically onto a metal plate which is then etched until only the metal part itself remains. The finished product is thus produced chemically so that the mechanical characteristics of the metal are unchanged, and the part is ready for use with no additional treatment required. Edge stressing and burring do not occur in a part made by means of chemical machining. It will be understood that chemical machining involves selective etching of the metal with an etchant solution, which is usually an acid solution, with the parts of the metal not to be etched or removed being protected by a masking coating which is impervious to the etchant.

In a telescopic gunsight, or scope, the aiming point of the scope is formed by a reticle which is disposed in one of the focal planes within the scope. The reticle can take many forms, as for example, a dot, a post, or cross hairs. Probably the most common form of scope reticle is a cross hair. A cross hair reticle can be formed in a number of different ways. The ends of a pair of wires can be attached to a ring, the wires being disposed at a 90° angle to each other. The reticle cross hairs can be etched or painted on glass or plastic. Chemical machining can and has been used to form a one-piece cross hair reticle from a sheet of metal. The cross hairs and the peripheral ring are masked and the remainder of the metal on the sheet is then etched away. Cross hairs produced in this manner are preferable to the wire-type referred to above since they are of unitary one-piece construction and do not need to be assembled. They are also generally stronger and more durable than the wire-type cross hairs. It will be appreciated that durability in a cross hair reticle is important since the reticle defines the aiming point of the scope and is generally a fragile part of the scope.

One drawback exists with respect to the prior art chemically machined cross hair reticles. This drawback, or undesirable feature, arises from the fact that sharp radii cannot be formed by chemical machining. Inside radii formed from chemical machining are approximately equal to the thickness of the stock sheet from which the part is formed. Thus, at the point where the cross hairs of the reticle meet, i.e. at the aiming point of the reticle, there are formed four radii in a chemically machined one piece reticle, which radii are approximately equal to the thickness of the stock sheet from which the reticle was formed. The formation of these radii at the aiming point is undesirable because a crisp sharp intersection is better able to provide a distinct aiming point. The problem is worsened in certain types of variable power scopes in which the apparent size of the reticle increases as the power of the scope is increased.

In the prior art one piece chemically machined reticle there is no way to eliminate these internal radii at the cross hair intersection, and the only way to minimize them is to reduce the thickness of the stock sheet from which the reticle is machined. Reducing the stock sheet thickness is undesirable, however, since the resultant reticles will be fragile and subject to breakage.

This invention relates to chemically machined reticle which provides a sharp, non-radiused cross hair intersection, and which can be made from suitably thick sheet stock so as to ensure proper reticle strength. The reticle of this invention is made from two identical parts, each of which is formed by means of chemical machining. Each part is formed with a circular or other conventional peripheral portion and a single transverse cross hair which extends across the peripheral portion and through the center of the area bounded by the peripheral portion. Preferably, four outer tabs spaced 90° apart from each other are formed on the peripheral portion and project outwardly therefrom. A pair of these parts are assembled together with the single cross hairs on each part intersecting each other at a 90 angle while the respective peripheral portions are disposed in face-to-face contact and secured together as, for example, by an adhesive. There are no internal radii at the intersection since two separate parts are used, each of which has only one cross hair. Mass production is simplified since all of the parts are exactly the same. The assembled reticle is then secured to a reticle cell, as for example, by an adhesive. The reticle of this invention is thus a stronger, more durable reticle due to the fact that it is a multi-layer laminate.

It is, therefore, an object of this invention to provide an improved chemically machined cross hair reticle having no internal radii at the point of intersection of the cross hairs.

It is a further object of this invention to provide a reticle of the character described which is formed from two identical parts joined together.

It is an additional object of this invention to provide a reticle of the character described which is susceptible to mass production and simplified assembly.

It is yet another object of this invention to provide a method for making the reticle of the character described.

These and other objects and advantages of this invention will become more readily apparent from the following detailed description of a preferred embodiment of the reticle of this invention taken in conjunction with the accompanying drawings, in which.

Figure 1:
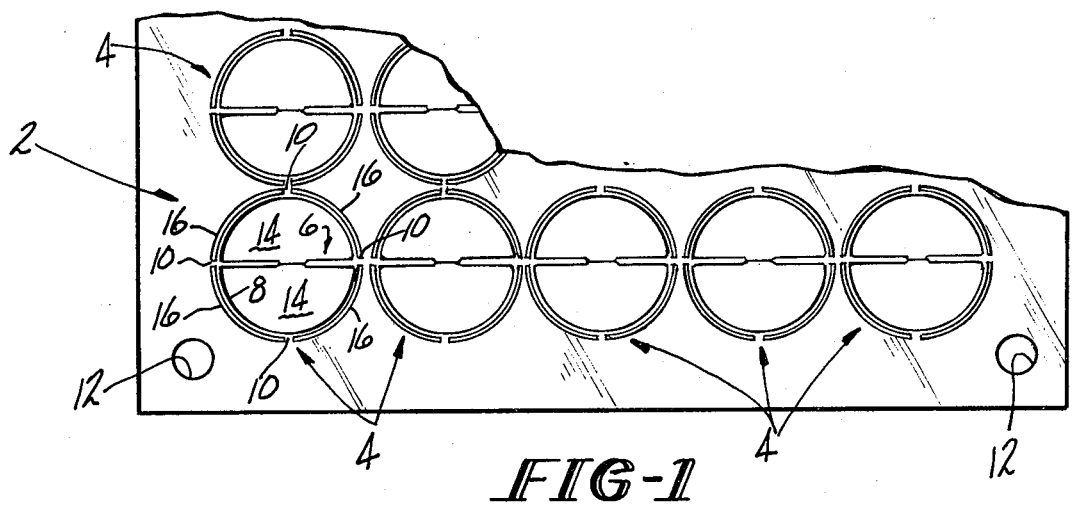
FIG. 1 is a plan view of a fragment of a sheet of stock material showing a plurality of identical reticle parts laid out thereon.

Referring now to the drawings, FIG. 1 shows a stock sheet 2 of material, such as thin gage steel or the like, from which the reticles of this invention will be made. Disposed on the sheet 2, which is shown fragmentarily only, are drawn or photographically depicted, a plurality of identical reticle parts 4. Each reticle part 4 includes a single cross hair 6 connected at each of its ends to an annular peripheral part 8. A plurality of tabs 10 extend outwardly radially from the peripheral part 8 at 90° intervals from each other, there being four tabs for each reticle part 4. Each sheet 2 of stock material is square, and is formed with locating holes 12 at each corner thereof. The reticle parts 4 are identically located and spaced on each sheet 2 for assembly purposes. To produce the reticle parts 4 on the stock sheets 2, the sheet is coated with a masking material which is impervious to the etchant being used. The only parts left uncoated are the two semi-circular areas 14 within the peripheral part 8 and between which the cross hair 6 lies, and the four curvilinear areas 16 which lie outwardly of the peripheral part 8 and extend between the tabs 10. The properly coated stock sheet 2 is then immersed in an etchant bath so that the uncoated areas 14 and 16 are chemically machined off of the sheet 2. A number of sheets of reticle parts are produced in this way. The etched sheets are then cleaned of the masking material.

Figure 3:
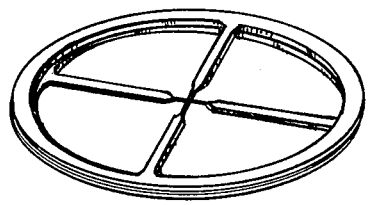
FIG. 3 is a perspective view of a compound reticle formed in accordance with this invention.
Figure 2:
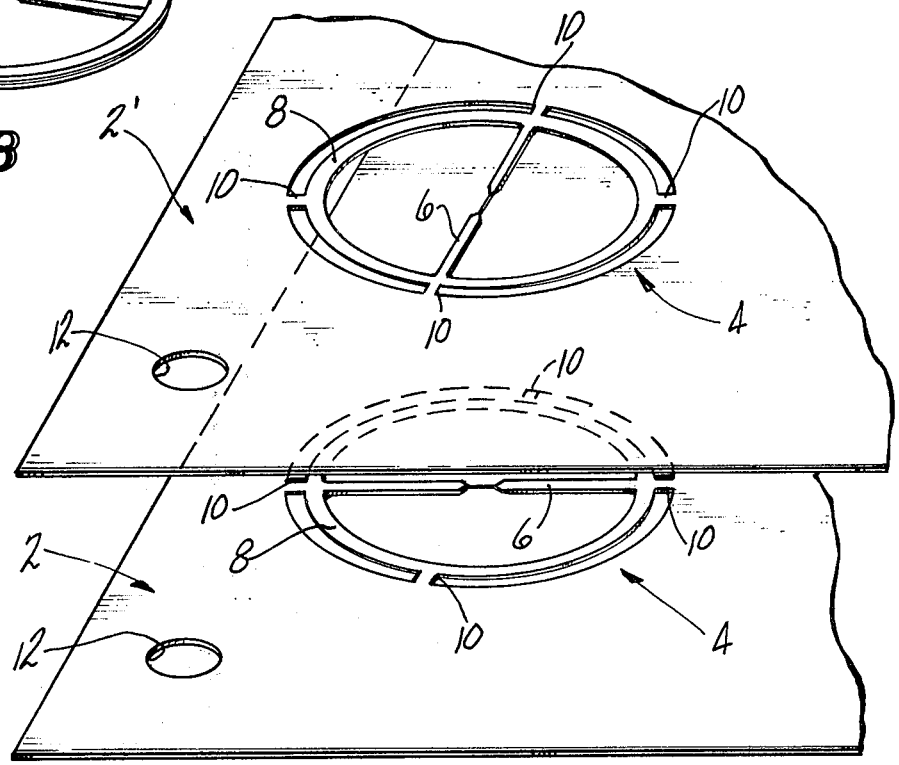
FIG. 2 is fragmented perspective view of a pair of the stock sheets of the type shown in FIG. 1 being brought into overlaying relationship prior to assembly of a plurality of reticles and after the sheets have been chemically machined.

In preparation for reticle assembly, the peripheral part 8 of each reticle part 4 is preferably coated with an adhesive material. To assemble a plurality of reticles, as shown in FIG. 2, one sheet 2 having the chemically machined reticle part 4 disposed on it is overlain with another similar sheet 2' which has been rotated 90° so that the cross hairs 6 in the sheet 2 are at a 90° angle to the cross hairs 6 in the sheet 2'. The locating holes 12 on the sheets 2 and 2' are brought into alignment as the sheet 2' is brought into face-to-face contact with the sheet 2. Pins may be used to maintain coaxiality of the holes 12. Since the spacing of the reticle parts 4 is identical in each sheet 2, the respective reticle parts 4 on the sheets 2 and 2' will combine to form a single reticle with perpendicular cross-hairs. The respective peripheral parts 8 will be cemented together to unify the reticle parts 4 into the single reticle, shown in FIG. 3. To remove the unified reticle from the sheets 2 and 2', the tabs 10 are severed and the reticle is thus freed.

The reticle is then cemented into a reticle cell (not shown) whereupon the assembly is ready for installation into a telescopic gunsight. It will be readily appreciated that the reticle of this invention will have no internal radii at the cross hair intersection despite being formed by chemical machining due to the fact that each cross hair is formed individually. The reticle of this invention can thus be formed from thicker stock sheet due to the lack of radius formation thereby resulting in a more durable reticle. Reticle durability is also enhanced by the laminated construction employed which provides a dual thickness peripheral part. Mass production capabilities of the method of this invention are readily apparent due to the formation of sheets of multiple reticle parts. Assembly is also amenable to automation wherein the composite reticles could be punched out of the sheets of stock material after chemical machining and lamination.

Since many changes and variations of the disclosed embodiment of the invention may be made without departing from the inventive concept, it is not intended to limit the invention otherwise than as required by the appended claims.

What is claimed is:

1. A reticle comprising a pair of relatively identical planar members, each planar member being formed from a unitary sheet of stock material and having an arcuate peripheral part surrounding two generally semi-circular hollow areas and an integral cross hair part extending between opposing sides of said arcuate peripheral part and separating said two generally semi-circular hollow areas, said members being permanently fixed in abutting relationship, said cross hair part on one member being substantially perpendicular and in fixed relative position to said cross hair part on the other member.

2. The reticle according to claim 1 wherein the planar members on each unitary sheet of stock material are coated with an impervious masking material to mask the arcuate peripheral part and the cross hair part and are then immersed in an etchant bath to chemically machine off the uncoated stock material.

3. A method of forming a reticle for an optical gunsight, said method comprising the steps of:
   (a) providing a pair of sheets of stock material from which a reticle is to be formed;
   (b) forming on each of said sheets a plurality of identical reticle parts each having a peripheral portion and a cross hair part extending across said peripheral portion;
   (c) masking at least said peripheral portion and said cross hair part with impervious masking material on each of the plurality of reticle parts;
   (d) immersing each of said sheets in an etchant for a predetermined period of time to chemical machine off the unmasked portions of the sheets;
   (e) removing the sheets from the etchant;
   (f) removing any remaining etchant and the masking material from the sheets;
   (g) overlying one of said sheets with the other of said sheets so as to juxtapose a pair of reticle parts on each of said sheets, the cross hair part on one of said juxtaposed reticle parts being perpendicular to and in contact with the cross hair part of the other of said juxtaposed reticle parts;
   (h) securing said juxtaposed reticle parts together; and
   (i) removing said secured juxtaposed reticle from said sheets.

4. A method of forming a reticle for an optical gunsight, said method comprising the steps of:
   (a) forming at least two substantially identical reticle parts on a sheet of stock material each reticle part having a peripheral portion with a single planar integral cross hair part extending across said peripheral portion;
   (b) masking at least said peripheral portion and said cross hair part with an impervious masking material on each reticle part;
   (c) immersing said sheet in an etchant for a predetermined period of time to chemically machine off the unmasked portions;
   (d) removing the sheet from the etchant;
   (e) removing any etchant and the masking material from the sheet;
   (f) removing the reticle parts from the sheet;
   (g) orienting said reticle parts so that the cross hair part on one reticle part is perpendicular to the cross hair part on the other reticle part with the peripheral portions on each reticle part being in face-to-face contact; and
   (h) securing said reticle parts together.

* * * * *